Figure 3:
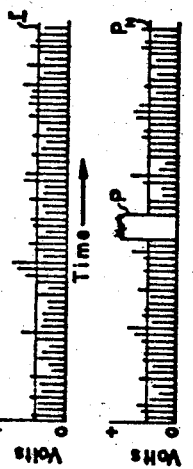

Dec. 6, 1949     B. D. LOUGHLIN     2,490,530
WAVE-SIGNAL ANALYZING SYSTEM
Filed Dec. 17, 1946     2 Sheets-Sheet 1
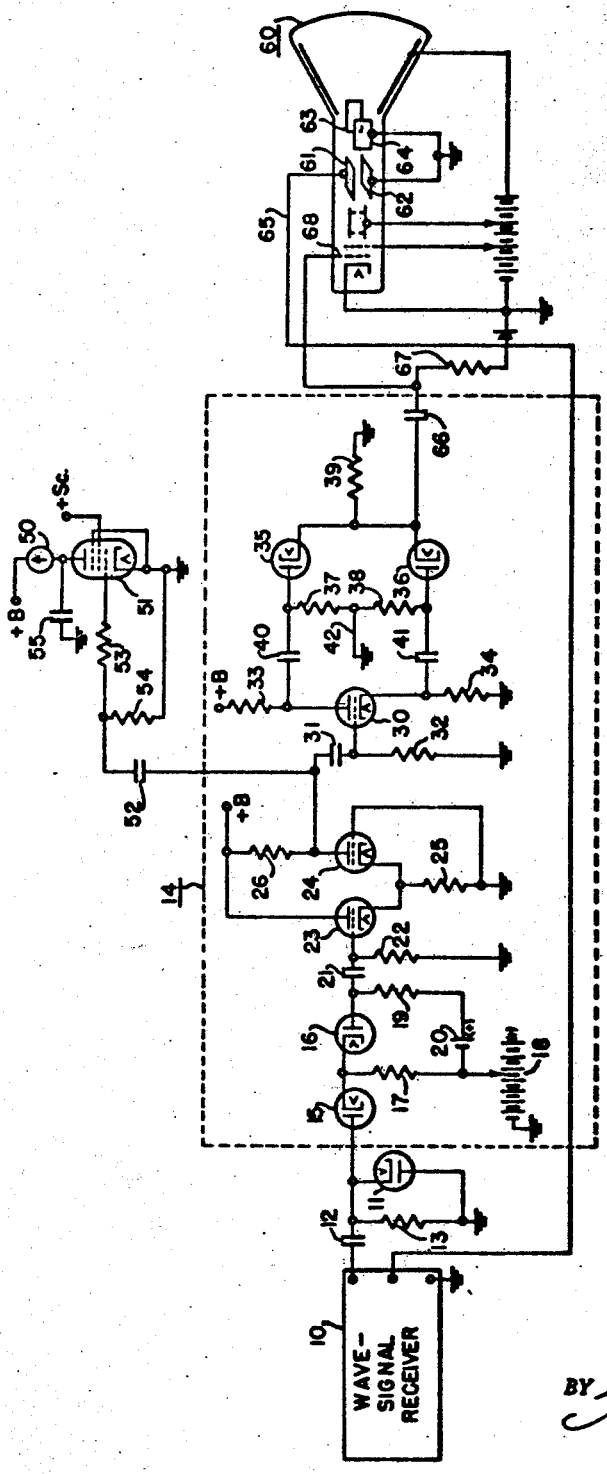
INVENTOR
BERNARD D. LOUGHLIN
BY Nancy B. Page
ATTORNEY Dec. 6, 1949  B. D. LOUGHLIN  2,490,530
WAVE-SIGNAL ANALYZING SYSTEM
Filed Dec. 17, 1946  2 Sheets-Sheet 2

INVENTOR.
BERNARD D. LOUGHLIN
BY Harry C. Page
ATTORNEY

Patented Dec. 6, 1949

2,490,530

UNITED STATES PATENT OFFICE 2,490,530

WAVE-SIGNAL ANALYZING SYSTEM

Bernard D. Loughlin, Lynbrook, N. Y., assignor to Hazeltine Research, Inc., Chicago, Ill., a corporation of Illinois Application December 17, 1946, Serial No. 716,854

11 Claims. (Cl. 171—95)

1

This invention is directed to systems for analyzing an applied wave signal and, while subject to a wide variety of applications, it is especially suited for indicating the root-mean-square (R.-M.-S.) value of a purely random noise signal. In the descriptive material to follow, the use of the invention in ascertaining signal-to-noise ratios of wave-signal translating devices will be considered in detail.

The signal-to-noise ratio is required in determining certain characteristics, such as sensitivity, of wave-signal translating arrangements. It is similar to a figure of merit for the arrangement under test and may be found in several well-known ways. For example, it is known that the ratio may be computed by utilizing a meter to measure the R.-M.-S. value of the noise-signal output of an arrangement for comparison with measured signal levels obtained at the input circuit of the arrangement. However, this method is not the most convenient one, particularly where it is also desirable to observe the wave form of the output signal of the arrangement.

Of course, the use of a cathode-ray tube oscilloscope for tracing the amplitude-time characteristic of an applied signal is also exceedingly well known in the art. Further, it has been proposed to calibrate the screen of the oscilloscope, enabling ratios to be found from the signal patterns traced thereon. While this sort of measuring system is acceptable, it necessitates careful calibration of the oscilloscope if reliable signal measurements are to be made. For most applications it is highly desirable to be able to ascertain signal-to-noise ratios through the use of an oscilloscope, but in a system in which an absolute calibration of the oscilloscope sensitivity is not required.

It is an object of the present invention, therefore, to provide a system for analyzing a wave signal which avoids one or more of the above-mentioned limitations of prior arrangements.

It is another object of the invention to provide a new and improved system for analyzing wave signals and especially suited for making signal-to-noise measurements.

It is a specific object of the invention to provide a new and improved system for determining signal-to-noise ratios through the use of an oscilloscope that does not require an absolute calibration of the oscilloscope.

In accordance with the invention, a system for analyzing a wave signal comprises a signal-translating stage, having two closely spaced amplitude limiting levels, effective to derive a

2 control effect during operating instants in which the amplitude of an applied signal is approximately equal to a preselected value, representing the mean value of the limiting levels. The system has a line-tracing device and a control arrangement for controlling this device to trace a pattern representing the amplitude-time characteristic of the applied signal and for concurrently utilizing the control effect to modulate the brightness of the pattern to indicate instantaneous amplitude values of the applied signal corresponding to the aforementioned preselected value.

For a better understanding of the present invention, together with other and further objects thereof, reference is had to the following description taken in connection with the accompanying drawings, and its scope will be pointed out in the appended claims.

Figure 4:
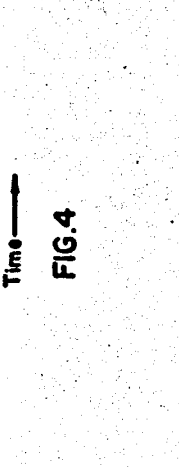
Figure 2:
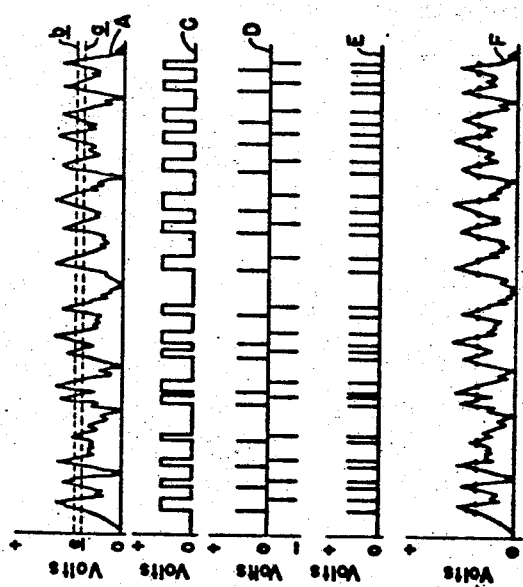

In the drawings, Fig. 1 is a schematic representation of a wave-signal analyzing system embodying the present invention; and Figs. 2, 3, and 4 comprise graphs utilized in explaining the operation of the Fig. 1 arrangement.

Referring now more particularly to Fig. 1, the system there represented may be used to analyze any applied wave signal but it is especially suited for making measurements which involve the random noise-signal output of a wave-signal translating arrangement, indicated at 10. This arrangement may constitute any apparatus which accommodates and translates wave signals but, for the purposes of a detailed explanation of the invention, it will be considered as a receiver for utilizing a signal of pulse wave form.

The system of the present invention for analyzing the signal output of receiver 10 comprises a direct-current (D.-C.) reinserter or stabilizing arrangement of well-known form for stabilizing a rectified signal output of the receiver for application to a signal-translating stage 14, presently to be described. The stabilizing is accomplished in a circuit including a diode 11, the anode of which is grounded while its cathode is connected to the output circuit of receiver 10 through a condenser 12. The resistor 13 is included in the load circuit of diode 11 so that the potential developed thereacross represents a stabilized wave signal.

The stabilized wave signal is applied to a signal-translating stage 14 of the limiter type. This stage comprises a pair of diodes 15 and 16. The anode of the former is directly connected with the high-potential terminal of load resistor 13 and the cathodes of both diodes are connected through a load resistor 17 to a source of bias potential, represented by a battery 18. A further load resistor 19 and bias source 20 couple the anode of diode 16 to the low-potential terminal of resistor 17, thereby to complete the load circuit of diode 16. The batteries 18 and 20 define two amplitude-limiting levels for the stage, and the adjustable connection to battery 18 provides means for simultaneously adjusting both limiting levels equal amounts in the same direction or sense. The need for this adjustment will become apparent from the description of the operation of the system.

A condenser 21 and resistor 22 couple the limiter, including diodes 15 and 16, to a wave-signal repeater provided by a pair of triode vacuum tubes 23 and 24. The cathodes of these triodes are interconnected through a common cathode impedance 25 which couples the tubes and also serves to stabilize their operation. The anode of tube 23 is directly connected with a space-current source, indicated +B, while the anode of the other tube 24 is connected thereto by way of an anode resistor 26. The circuit of tube 23 is a cathode follower while tube 24 is a cathode-input grounded-grid repeater so that signal variations of one polarity introduced into the input circuit of tube 23 appear as signal variations of the same polarity in the output circuit of tube 24. Preferably, the repeater 23, 24 is arranged to effect symmetrical limiting of signals translated therethrough from diodes 15, 16.

The output circuit of tube 24 is connected through a differentiating circuit to the input electrodes of an additional wave-signal repeater, including a triode vacuum tube 30. The differentiating circuit consists of a condenser 31 having one terminal connected with the anode electrode of tube 24 and a resistor 32 having one terminal grounded. The common terminal of elements 31 and 32 connects with the control electrode of tube 30. A balanced output is available from tube 30 by virtue of an anode impedance 33 connecting to a source of space current +B and a cathode impedance 34 through which the cathode is grounded. A pair of diodes 35 and 36 permit an output signal of one polarity to be obtained from repeater 30. These diodes have individual anode resistors 37, 38 and share a common cathode impedance 39. Condensers 40 and 41 connect diodes 35 and 36 to the anode and cathode electrodes, respectively, of tube 30. The load circuit of each diode is completed by a common ground connection 42. The described signal-translating stage 14 constitutes means for deriving a control effect during operating intervals in which the amplitude of an applied signal is approximately equal to a preselected value to be defined particularly in connection with the operation of the system.

The system also has means for determining the percentage of an observation interval in which a signal applied to stage 14 has an amplitude level corresponding to or exceeding the preselected value mentioned in the preceding paragraph. This means is shown as a milliammeter 50 included in the anode-cathode circuit of a pentode-type vacuum tube 51. The input electrodes of this tube are connected with the output circuit of repeater 24 through a coupling condenser 52, a grid resistor 53 of high value, and a leak resistor 54. Operating potentials are applied to the pentode tube in the usual manner and a condenser 55 provides a by-pass for the milliammeter. The parameters of the circuit of tube 51 are chosen to effect limiting of applied pulses of positive polarity so that the full saturated current of the tube is substantially equal to the current established in the absence of signals in its input circuit.

A line-tracing device, shown as a cathode-ray tube or oscilloscope 60, is included in the system for tracing signal patterns. The cathode-ray tube has an electrode system for producing an electron beam which may be controlled by applied signals to trace patterns. The traverse of the electron beam across the screen of the tube to establish a signal pattern thereon is under the control of vertical deflecting electrodes 61, 62 and horizontal deflecting electrodes 63, 64 in the usual manner. A conductor 65 connected with the output circuit of receiver 10 constitutes means for applying the signal output of the receiver to the vertical deflecting elements. A time-base signal supplied by a scanning generator (not shown) is applied to the horizontal electrodes 63, 64 to effect horizontal scanning in the oscilloscope. The control effect obtained from signal-translating stage 14 is supplied by way of a condenser 66 and grid resistor 67 to the brilliancy-control electrode 68 of the tube. This electrode comprises means for utilizing the control effect supplied by stage 14 to modulate the brightness of the electron beam of the cathode-ray tube and the signal pattern traced thereby.

In considering the operation of the wave-signal analyzing system represented in Fig. 1, reference is made to the curves of Fig. 2, and it will be assumed initially that only a rectified noise-signal output of positive polarity is obtained from receiver 10. This signal, which is applied directly to the stabilizing diode 11, is stabilized on its negative peaks and a portion of the stabilized noise signal is represented by curve A, having an expanded time base to facilitate the showing of the signal. As is characteristic of a purely random noise signal, the amplitude-time characteristic varies in a random fashion. The stabilized noise signal is supplied to signal-translating stage 14 and the portions thereof which represent amplitude values within the range determined by the limiting levels of diodes 15 and 16 are translated to derive a control effect. The first amplitude-limiting level is designated by horizontal line a of Fig. 2. It corresponds with the amplitude-delay bias applied to the cathode of diode 15 from battery 18. The second limiting level, represented by horizontal line b, is established by battery 18 and the other battery 20 included in the circuit of diode 16. Battery 20 has a small value so that the levels a and b are closely spaced and define a very narrow amplitude range. Together they control conduction through diodes 15 and 16 to effect square-wave limiting. That is, the bias batteries 18 and 20 permit diodes 15 and 16 to translate only such portions of an applied signal as occur within the narrow amplitude range a—b.

It will be apparent, for example, that diode 15 is rendered conductive only when the amplitude of the applied signal exceeds the delay bias impressed on its cathode by battery 18. Current flow through diode 15 produces a positive potential on the cathode of diode 16 and, during operating intervals in which the bias thus applied exceeds the potential of battery 20, diode 16 is rendered nonconductive. Consequently, in response to the applied signal of curve A, a control signal is derived from the circuit of diodes 15 and 16 as shown by curve C. For convenience, the voltage scale of curve C has been exaggerated more clearly to represent this signal. The control signal is of substantially rectangular wave form and includes spaced pulses, the leading and trailing edges of which occur during intervals in which the amplitude of the noise signal is approximately equal to a preselected value e, corresponding to the mean value of limiting levels a and b.

The control signal is repeated, amplified, and sharpened in wave form by limiter tubes 23 and 24 and, after differentiation by condenser 31 and resistor 32, appears in the input circuit of tube 38 with the wave form of curve D. The positive signal components of curve D are derived from the leading edges and the negative components indicate the trailing edges of the spaced pulses of the control signal of curve C. Positive-polarity components of the input signal to repeater 38 appear in the cathode circuit thereof with the same polarity and are translated by diode 36. However, in view of the polarity-reversing characteristics of a single-stage amplifier, such components are applied to the anode of diode 35 with negative polarity and are not translated by that diode. Negative-polarity components of the signal of curve D, on the other hand, are passed by diode 35 but are rejected by diode 36. Therefore, the signal variations across the common load resistor 39 of diodes 35 and 36 give rise to a control effect having a wave form represented by curve E, including only positive-polarity components. Each component represents an operating instant in which the amplitude of the random noise signal of curve A is approximately equal to the preselected value e, determined by the limiting levels a and b, as explained above. Thus, the final output signal of unit 14 is a series of pulses of positive polarity representing a selected amplitude value of the random signal. These components are utilized to modulate the intensity of the cathode-ray beam of tube 60 and establish a reference amplitude level on the signal pattern traced by the tube.

The random noise signal translated to produce the control signal of curve E is applied directly to the vertical deflecting elements 61, 62 of cathode-ray tube 60. It controls the vertical deflection of the cathode-ray beam during each line-tracing traverse and traces out the random amplitude-time characteristic of the noise signal in conventional manner. Concurrently with the tracing of this pattern, the control signal of curve E, which is applied to the brilliancy-control electrode 68 of the cathode-ray tube, modulates the beam intensity and produces bright spots on the traced pattern in time coincidence with each component of the signal of curve E. The resulting signal pattern traced by the cathode-ray tube is represented by curve F. The representation in this curve assumes no time delay in the derivation of the control signal of curve E so that the spot designations of the curve correspond with instantaneous amplitude values of the random noise signal equal to the mean value e of limiting levels a and b. The brightness modulation of the traced pattern may be interpreted through the aid of milliammeter 58 in the following way.

The milliammeter indicates the average anode current of tube 51 and reflects variations in the average current under the influence of the signal output of repeater 24, shown in curve C. This signal, being applied to tube 51 through a condenser 52, has both positive and negative pulse variations about its alternating-current axis. In view of the limiting on positive pulses mentioned above, such pulses have little or no effect on the plate current of tube 51. However, each negative pulse component cuts the tube off and decreases the average current in accordance with the duration and occurrence of the negative pulse components. Since the a—c axis of the signal input to tube 51 corresponds with the mean value e of the selected levels a and b, the variation in average current of tube 51, as shown by the reading of meter 58, is related to the percentage of the observation time in which the amplitude of the noise signal of receiver 10 is less than or greater than the mean value e. Where it is desired to have the brightness modulation of the signal pattern of tube 60 establish the R.-M.-S. value of the random noise signal, the adjustable connection to battery 18 is set to create an operating condition in which milliammeter 58 shows that the amplitude of the random noise signal is less than the mean value e for 68.3 per cent of the observation time, as indicated by a current reading of 31.7 per cent of the full saturated current. With this adjustment the bright spots which the control signal of curve E produces on the amplitude-time characteristic traced on tube 60 represent the R.-M.-S. value of the random noise. This is so because it has been determined that purely random noise has a property such that its instantaneous value is less than its R.-M.-S. value for 68.3 per cent of the time.

The curve of Fig. 3 shows the signal pattern established on the screen of the cathode-ray tube after a series of horizontal traverses of the screen by the electron beam under the influence of the time-base signal applied to the horizontal deflecting electrodes. The horizontal line r again indicates the R.-M.-S. value of the applied noise signal, assuming no time delay in deriving the control effect of curve E. If there is any appreciable delay in obtaining this control effect, the line r is replaced by two lines equally spaced with respect to the R.-M.-S. value.

In making signal-to-noise measurements, the system is operated in the manner outlined above to establish an indication of the R.-M.-S. value of noise on the screen of the cathode-ray tube. In this manner a reference level is found which may be compared with the output of receiver 10 in the presence of a received signal to determine the signal-to-noise ratio.

Where the receiver translates pulses having a duration short with reference to their time separation, a signal pattern as represented by the curve of Fig. 4 is traced on the cathode-ray tube. By suitably synchronizing the time base with the repetition frequency of the received pulses P, the pulse representation is stationary in the signal pattern and a visual representation of the signal-to-noise ratio is traced on the screen of the cathode-ray tube. The actual value of this ratio may be readily computed by comparing the height of the R.-M.-S. noise value, shown by the horizontal line $P_N$ in Fig. 4, to the height of the pulse component P. This operation is possible since the signal output of the receiver in the presence of a pulse-modulated signal of the type described includes only a random noise component in the period between successive pulses. Where the pulse separation is very long with reference to the pulse duration, the control voltage of curve E is not materially affected even though the pulse signal as well as the random noise component obtained from receiver 10 are applied to unit 14

The described system is very flexible. It may respond solely to the noise-signal output of receiver 10, where that is desired, to produce a pattern of the type shown in Fig. 3 representing the amplitude-time characteristic of the random noise signal as well as its R.-M.-S. value. It may utilize the signal output of the receiver during operating intervals in which pulses of short duration and a long time separation are received to establish a pattern of the type shown in Fig. 4 from which signal-to-noise measurements may be made directly. Where the received signal has continuous modulation, the signal-to-noise ratio may be determined by interrupting the modulation for an observation interval in which the R.-M.-S. value of the noise output of the receiver is ascertained for comparison with an oscilloscope picture of the received signal. When the modulation is interrupted, the noise with a carrier present is symmetrical noise because in such a case the phase of the noise is significant, enabling the noise signal either to add to or subtract from the carrier signal. In this case the noise may be measured by removing the D.-C. reinserter circuit, including diode 11, and obtaining a reading on meter 56 of 15.9 per cent. of saturation current.

It will be understood that the noise signal referred to is the random noise present in all communication equipment. It is contributed by shot effect, thermal agitation, and the like. Noise of this type has the property that its instantaneous amplitude value is less than its R.-M.-S. value for 68.3 per cent. of the time. The battery 18 which predominantly determines the mean value of the limiting levels $a$ and $b$ provides a measure in terms of a D.-C. potential of the R.-M.-S. value of noise, when the arrangement of Fig. 1 utilizes only the random noise output of receiver 10.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for analyzing a wave signal comprising: a signal-translating stage effective to derive a control effect during operating instants in which the amplitude of said signal is approximately equal to a preselected value; a line-tracing device; a control arrangement for controlling said line-tracing device to trace a pattern representing the amplitude-time characteristic of said signal and for concurrently utilizing said control effect to modulate the brightness of said pattern to indicate instantaneous amplitude values of said signal corresponding to said preselected value; and means for determining the per cent. of an observation interval in which said signal has at least said preselected value.

2. A system for analyzing a wave signal comprising: a signal-translating stage, having two closely spaced amplitude-limiting levels, effective to derive a control effect during operating instants in which the amplitude of said signal is approximately equal to a preselected value, representing the mean value of said limiting levels; a line-tracing device; and a control arrangement for controlling said line-tracing device to trace a pattern representing the amplitude-time characteristic of said signal and for concurrently utilizing said control effect to modulate the brightness of said pattern to indicate instantaneous amplitude values of said signal corresponding to said preselected value.

3. A system for analyzing a wave signal comprising: a signal-translating stage, having two closely spaced amplitude-limiting levels, effective to derive a control effect during operating instants in which the amplitude of said signal is approximately equal to a reference value, representing the mean value of said limiting levels; means for adjusting said limiting levels to establish said reference at a preselected value; a line-tracing device; and a control arrangement for controlling said line-tracing device to trace a pattern representing the amplitude-time characteristic of said signal and for concurrently utilizing said control effect to modulate the brightness of said pattern to indicate instantaneous amplitude values of said signal corresponding to said preselected value.

4. A system for analyzing a wave signal comprising: a signal-translating stage, having two closely spaced amplitude-limiting levels, effective to derive a control effect during operating instants in which the amplitude of said signal is approximately equal to a reference value, representing the mean value of said limiting levels; means for simultaneously adjusting said limiting levels equal amounts in the same sense to establish said reference at a preselected value; a line-tracing device; and a control arrangement for controlling said line-tracing device to trace a pattern representing the amplitude-time characteristic of said signal and for concurrently utilizing said control effect to modulate the brightness of said pattern to indicate instantaneous amplitude values of said signal corresponding to said preselected value.

5. A system for analyzing an applied wave signal comprising: a signal-translating stage, having two closely spaced amplitude-limiting levels, for deriving a control signal of substantially rectangular wave form including spaced pulses the leading and trailing edges of which occur during operating instants in which the amplitude of said applied signal is approximately equal to a preselected value, representing the mean value of said limiting levels; a line-tracing device; and a control arrangement for controlling said line-tracing device to trace a pattern representing the amplitude-time characteristic of said applied signal and for concurrently utilizing said control signal to modulate the brightness of said pattern to indicate instantaneous amplitude values of said applied signal corresponding to said preselected value.

6. A system for analyzing an applied wave signal comprising: a signal-translating stage, having two closely spaced amplitude-limiting levels, for deriving a control signal of substantially rectangular wave form including spaced pulses the leading and trailing edges of which occur during operating instants in which the amplitude of said applied signal is approximately equal to a preselected value, representing the mean value of said limiting levels; means associated with said stage for differentiating said control signal to obtain a control effect from said edges of said spaced pulses; a line-tracing device; and a control arrangement for controlling said line-tracing device to trace a pattern representing the amplitude-time characteristic of said applied signal and for concurrently utilizing said control effect to modulate the brightness of said pattern to indicate instantaneous amplitude values of said applied signal corresponding to said preselected value.

7. A system for analyzing an applied wave signal comprising: a signal-translating stage, having two closely spaced amplitude-limiting levels, for deriving a control signal of substantially rectangular wave form including spaced pulses the leading and trailing edges of which occur during operating instants in which the amplitude of said applied signal is approximately equal to a preselected value, representing the mean value of said limiting levels; a line-tracing device; a control arrangement for controlling said line-tracing device to trace a pattern representing the amplitude-time characteristic of said applied signal and for concurrently utilizing said control signal to modulate the brightness of said pattern to indicate instantaneous amplitude values of said applied signal corresponding to said preselected value; and means coupled to said stage for indicating the ratio of total pulse time of said control signal during an observation interval to the total duration of said observation interval, thereby to determine the per cent. time in which said applied signal has at least said preselected value.

8. A system for analyzing a random noise signal to indicate its root-mean-square value comprising: a signal-translating stage having two closely spaced, adjustably fixed amplitude-limiting levels effective to derive a control effect during operating instants in which the amplitude of said signal is approximately equal to a preselected value, representing the mean value of said limiting levels; a line-tracing device; a control arrangement for controlling said line-tracing device to trace a pattern representing the amplitude-time characteristic of said signal and for concurrently utilizing said control effect to modulate the brightness of said pattern to indicate instantaneous amplitude values of said signal corresponding to said preselected value; and means for determining an operating condition of said system in which the amplitude of said noise signal is less than said preselected value 68.3 per cent of the observation time, whereby the indication of said preselected value in said traced pattern corresponds with the root-mean-square value of said signal.

9. A system for analyzing a random noise signal to indicate its root-mean-square value comprising: means for stabilizing said signal on one set of its peak values; a signal-translating stage having two closely spaced, adjustably fixed amplitude-limiting levels effective to derive a control effect during operating instants in which the amplitude of said stabilized signal is approximately equal to a preselected value, representing the mean value of said limiting levels; a line-tracing device; a control arrangement for controlling said line-tracing device to trace a pattern representing the amplitude-time characteristic of said signal and for concurrently utilizing said control effect to modulate the brightness of said pattern to indicate instantaneous amplitude values of said signal corresponding to said preselected value; and means for determining an operating condition of said system in which the amplitude of said noise signal is less than said preselected value 68.3 per cent. of the observation time, whereby the indication of said preselected value in said traced pattern corresponds with the root-mean-square value of said signal.

10. A system for analyzing the signal output of a wave-signal translating arrangement to determine the signal-to-noise ratio thereof comprising: a signal-translating stage for responding primarily to the random noise component of said signal to derive a control effect during operating instants in which the amplitude of said noise component is approximately equal to a preselected value; a line-tracing device; a control arrangement for controlling said line-tracing device to trace a pattern representing the amplitude-time characteristic of said noise component and for concurrently utilizing said control effect to modulate the brightness of said pattern to indicate instantaneous amplitude values of said noise component corresponding to said preselected value; and means for determining an operating condition of said system in which the amplitude of said noise signal is less than said preselected value 68.3 per cent. of the observation time, whereby the indication of said preselected value in said traced pattern corresponds with the root-mean-square value of said signal and provides a reference suitable for ascertaining the signal-to-noise ratio of said arrangement.

11. A system for analyzing the signal output of an arrangement translating signal pulses having a duration very short with reference to their time separation to determine the signal-to-noise ratio thereof comprising: a signal-translating stage for responding primarily to the random noise component of said signal occurring between said pulses to derive a control effect during operating instants in which the amplitude of said noise component is approximately equal to a preselected value; a line-tracing device; a control arrangement for controlling said line-tracing device to trace a pattern representing the amplitude-time characteristic of said noise component and said pulses and for concurrently utilizing said control effect to modulate the brightness of said pattern to indicate instantaneous amplitude values of said noise component corresponding to said preselected value; and means for determining an operating condition of said system in which the amplitude of said noise signal is less than said preselected value 68.3 per cent. of the observation time, whereby the indication of said preselected value in said traced pattern corresponds with the root-mean-square value of said signal and provides a visible representation of the signal-to-noise ratio of said arrangement.

BERNARD D. LOUGHLIN.

REFERENCES CITED

The following references are of record in the file of this patent:

UNITED STATES PATENTS

| Number | Name | Date |
|---|---|---|
| 2,241,256 | Gould | May 6, 1941 |
| 2,269,226 | Rohats | Jan. 6, 1942 |
| 2,285,038 | Loughlin | June 2, 1942 |